United States Patent
Kumar et al.

(10) Patent No.: US 7,281,201 B2
(45) Date of Patent: Oct. 9, 2007

(54) COMMON MESSAGE AREA FOR A CUSTOMER INTERACTION CENTER USER INTERFACE

(75) Inventors: Janaki Kumar, Palo Alto, CA (US); Vivek Bhanuprakash, Sunnyvale, CA (US)

(73) Assignee: SAP Aktiengesellschaft, Walldorf (DE)

( * ) Notice: Subject to any disclaimer, the term of this patent is extended or adjusted under 35 U.S.C. 154(b) by 314 days.

(21) Appl. No.: 10/723,742

(22) Filed: Nov. 26, 2003

(65) Prior Publication Data
US 2005/0114753 A1 May 26, 2005

(51) Int. Cl.
*G08F 15/00* (2006.01)
(52) U.S. Cl. .................. 715/500.1; 715/514; 715/526
(58) Field of Classification Search ............. 715/500, 715/500.1, 512, 514, 515, 526
See application file for complete search history.

(56) References Cited

U.S. PATENT DOCUMENTS

| | | | |
|---|---|---|---|
| 5,265,207 A * | 11/1993 | Zak et al. ...................... 712/15 |
| 5,666,215 A * | 9/1997 | Fredlund et al. ............ 358/487 |
| 5,983,369 A | 11/1999 | Bakoglu et al. |
| 6,073,119 A * | 6/2000 | Bornemisza-Wahr et al. . 705/42 |
| 6,163,772 A * | 12/2000 | Kramer et al. ................ 705/79 |
| 6,330,243 B1 | 12/2001 | Strandberg |
| 6,370,563 B2 | 4/2002 | Murakami et al. |
| 6,999,990 B1 | 2/2006 | Sullivan et al. |
| 2001/0048449 A1 | 12/2001 | Baker |
| 2001/0054064 A1 | 12/2001 | Kannan |
| 2002/0064149 A1 * | 5/2002 | Elliott et al. ................. 370/352 |
| 2002/0130904 A1 | 9/2002 | Becker et al. |
| 2003/0035532 A1 * | 2/2003 | Ganesan et al. ....... 379/265.04 |
| 2003/0043180 A1 | 3/2003 | Gusler et al. |
| 2003/0058277 A1 * | 3/2003 | Bowman-Amuah ......... 345/765 |
| 2003/0187672 A1 | 10/2003 | Gibson et al. |
| 2003/0187876 A1 * | 10/2003 | Ohnishi .................... 707/104.1 |
| 2003/0195811 A1 * | 10/2003 | Hayes et al. .................. 705/26 |
| 2003/0231241 A1 * | 12/2003 | Iida ........................ 348/207.99 |
| 2004/0054647 A1 * | 3/2004 | Inaba et al. .................... 707/1 |
| 2004/0174980 A1 * | 9/2004 | Knott et al. ........... 379/266.01 |
| 2004/0260759 A1 * | 12/2004 | Smoliar et al. ............. 709/201 |
| 2005/0075115 A1 * | 4/2005 | Corneille et al. ........ 455/456.3 |

OTHER PUBLICATIONS

SAP Aktiengesellschaft, "Broadcast Messaging," CRM 4.0, SP01, Jul. 2003, 3 pgs.
U.S. Appl. No. 10/366,644, filed Feb. 13, 2003, Lueckhoff.
U.S. Appl. No. 10/366,674, filed Feb. 13, 2003, Lueckhoff.
U.S. Appl. No. 10/738,620, filed Dec. 16, 2003, Lueckhoff et al.

* cited by examiner

*Primary Examiner*—Stephen Hong
*Assistant Examiner*—Gregory J. Vaughn
(74) *Attorney, Agent, or Firm*—Fish & Richardson P.C.

(57) ABSTRACT

Various implementations for a common message area for a customer interaction center user interface are provided. One implementation provides presenting, on an interaction center agent display device, a single user interface panel having, firstly, a work area that displays information pertaining to a particular customer with whom an interaction center agent is interacting, and secondly, a common message area for displaying electronic messages to be viewed by one or more interaction center agents.

30 Claims, 6 Drawing Sheets

COMMON MESSAGE AREA FOR A CUSTOMER INTERACTION CENTER USER INTERFACE

TECHNICAL FIELD

This invention relates to computing systems, and more particularly to a common message area for a customer interaction center user interface within such systems.

BACKGROUND

In today's business society, customer relations and customer satisfaction are critical for successful and profitable operations. Customers are purchasing various products and services from a variety of providers, and use various purchase means. When customers purchase various products and services, they often have questions, concerns, or complaints about their purchases. To maximize customer satisfaction, businesses must be capable of responding quickly and effectively to customer questions, concerns, or complaints. Many businesses employ customer care agents who are responsible for interacting with customers. These agents may interact with customers personally or over the telephone. More recently, many customer care agents engage in interactive chat sessions with customers over the Internet. These chat sessions allow agents to communicate quickly and easily with customers all over the world.

When such agents interact with customers, they often need to be able to address a wide variety of questions, and provide detailed and effective answers. To do so, the agents interact with customers with the help of customer information displayed on a computer screen. Typically, a customer interaction center may include a message board used to display messages that need to be seen by multiple agents, and thus such a message board is typically positioned so that several agents can see the board. The message board may be used, for example, to display messages from a supervisor.

SUMMARY

Various implementations for displaying messages that need to be seen by multiple customer interaction center agents are provided.

In one implementation, techniques are provided that include presenting, on an interaction center agent display device, a single user interface panel having, firstly, a work area that displays information pertaining to a particular customer with whom an interaction center agent is interacting, and secondly, a common message area for displaying electronic messages to be viewed by one or more interaction center agents.

In some implementations, the techniques may include one or more of the following features. The electronic messages may be sent from a supervisor computer device, and the electronic messages may include a visual identifier to indicate a priority associated with the messages. The electronic messages may be displayed according to criteria such as date/time information related to when the messages are to expire and a priority associated with the electronic messages. The electronic messages may scroll across the common message area and the scrolling action may be controlled according to interaction center agent movement of a cursor over the common message area.

The electronic messages may include status information indicating that an electronic message is new and not read by the interaction center agents such that the new message is added to the common message area. The electronic messages may include status information indicating that a message has been read by interaction center agents and marked as read, whereby the read message is removed from the common message area. The electronic messages may include status information indicating that a time period of the message has expired, whereby the expired message is removed from the common message area.

A user selection may be able to select an electronic message from the common message area. The selected message may include status information that is controllable by interaction center agents. A user may select a message by clicking on a message in the message area with a computer input device including a mouse or keyboard. In response to a user selection, a message window is presented to allow interaction center agents to search/sort a list of electronic messages according to criteria such as a date/time a message was created, priority of a message, creator of a message, and one or more terms/phrases in a message.

Advantages of certain implementations of the invention may be one or more of the following. For example, the GUI includes a work area for customer information and a message area for displaying scrolling messages sent/broadcast from a supervisor of the agent. The supervisor of the agent is able to broadcast messages with varying levels of importance/priority to the agent while the agent is communicating with a customer. The agent has the option to pause the scrolling action and select/view individual messages without disturbing the flow of a customer interaction. Communication between the agent and supervisor may be improved without disturbing the flow of a customer interaction, increasing customer responsiveness and satisfaction.

The details of one or more embodiments of the invention are set forth in the accompanying drawings and the description below. Other features, objects, and advantages of the invention will be apparent from the description and drawings, and from the claims.

DETAILED DESCRIPTION

The systems and techniques described here relate to displaying messages that need to be seen by multiple customer interaction center agents using a graphical user interface (GUI). For example, in a customer interaction center using a Web-based client application, an agent is able to asynchronously receive broadcast messages from a supervisor. The messages can be displayed in a scrolling manner on the agent station in a visible area of the screen while the agent interacts with a customer. The agent is then able to select and view individual messages without disturbing the flow of the customer interaction.

Figure 1:
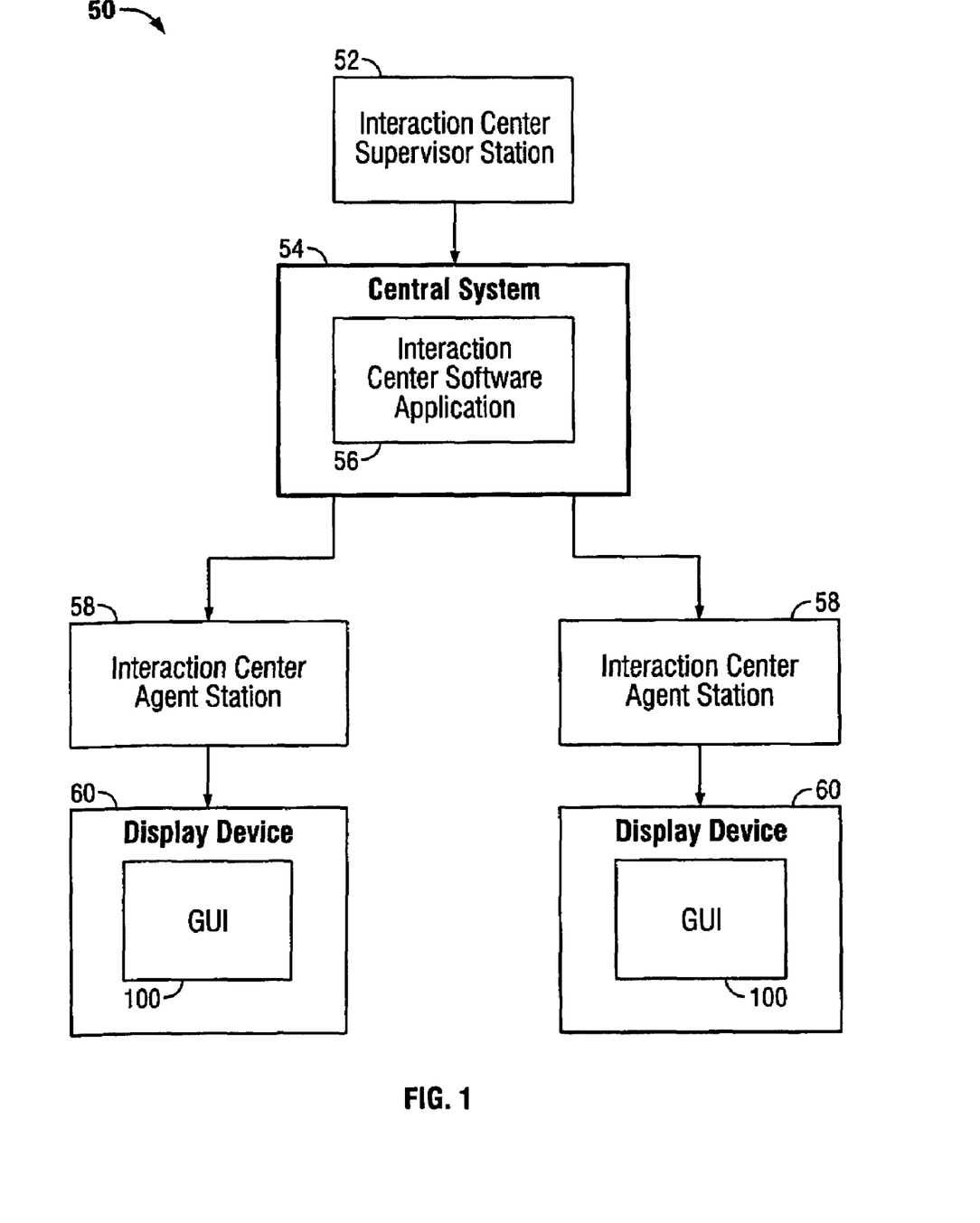
FIG. 1 is an exemplary block diagram of a customer interaction center.

FIG. 1 is an exemplary block diagram of a customer interaction center 50. The customer interaction center 50 includes a central system 54 having an interaction center application software 56, one or more interaction center agent stations 58 each having a display devices 60 for displaying a graphical user interface (GUI) panel 100, and one or more interaction center supervisor stations 52. The customer interaction software application 56 includes functionality for generating information such as electronic messages to each of the GUI panels 100 of the display device 60. The interaction center system 50 also may include a network of telephony or equipment, network of computers, and/or routing system using a plain old telephone system (POTS) for routing incoming customer requests (e.g., telephone calls, on-line requests, or other). These systems route the requests to center agent telephones and/or workstations (e.g., emails and chat sessions).

The interaction center 50 provides an infrastructure for handling a customer interaction session. Such a session may involve a customer contacting an interaction center and have the center handle questions or problems regarding a product purchased by the customer. The interaction center stations 52 are assigned to one or more managers or supervisors who are responsible for handling workflow, calls and agent concerns. Such task may include exchanging information between a supervisor and agents. For example, a supervisor sends messages to the agents from a supervisor station 52 for display on the display device 60 of all of the agent stations 58. As a result, a separate message board is no longer necessary because the interaction center agents can view and perform actions on the messages. This provides added flexibility to set up the interaction center 50, for example, agents no longer need to be positioned to see the board and may even be in completely different locations. Described below is an example of a GUI 100 that would be displayed on the agent display device 60. The GUI 100 includes, firstly, a work area that displays information pertaining to a particular customer with whom an interaction center agent is interacting, and secondly, a common message area for displaying electronic messages to be viewed by one or more interaction center agents. The electronic messages are sent to the common message areas by a supervisor of the agents.

Figure 2A:
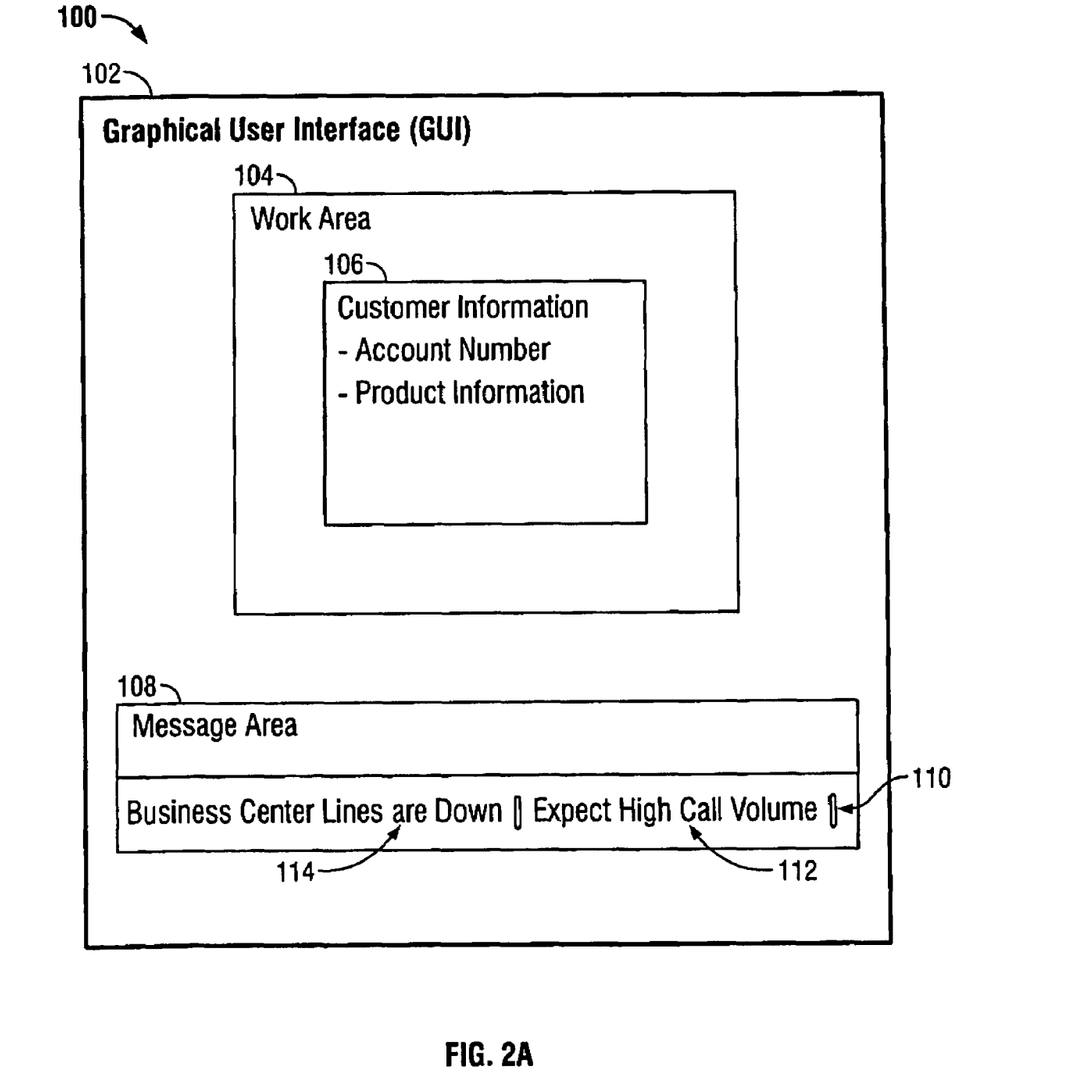
FIGS. 2A-2E show an exemplary graphical user interface for broadcasting messages according to one embodiment.

FIG. 2A shows an exemplary GUI 100 for displaying broadcast messages to interaction center agents while interacting with customers during a customer interaction session. The GUI 100 includes a work area 104 and a common message area 108. The work area 104 displays customer communication information 106 such as a customer's account number and product information associated and other information associated with a customer interaction session. The message area 108 displays electronic messages 112, 114 which may be configured to scroll across the message area 108. The agent may be able to view the messages 112, 114 and information on the work area 104 while interacting with a customer. The messages can be generated by a supervisor of the agent or automatically by a computer system in a customer interaction center. For example, a supervisor may generate to one or more agents a broadcast message indicating that the customer interaction center is experiencing a large number of customer calls. Alternatively, a computer system may detect a problem with the some aspect of the interaction center, such as a faulty server computer, and alert the agents by automatically sending a broadcast message to the agents. In this way, an agent can communicate with a customer while viewing customer information and messages on the same GUI.

The message area 108 may be positioned below the work area 104 so that the customer interaction center agent can view messages in the message area without being interrupted during a customer interaction session. As more messages arrive, they are concatenated and displayed as scrolling messages in a particular direction, such as scrolling in a horizontal direction from right to left. The message area 108 includes a separator 110, such as a "|" character, as a means of distinguishing one message from the other, but other separator means can be employed. The messages can be assigned one or more priority identifiers and can be highlighted for agent's immediate attention. For example, high priority items can be displayed in a bold format, whereas, normal priority messages can be displayed in non-bold format.

An agent can control the scrolling action of the message area 108. For example, an agent can move a mouse cursor over the message area 108 and/or messages 112, 114, causing the scrolling action to be paused temporarily. Once the agent moves the mouse away from the message area, the scrolling action can resume. As described in detail below, a message window can be generated displaying a list of messages or a selected message in response to a user selection of the message area. For example, a customer interaction center agent may have an interest in reading one of the messages in the message area 108. The agent can "click" on the message area 108 causing a message window (shown in FIG. 2B) to be displayed over the GUI 100. The messages can be text messages, graphical messages, or a combination. Although the above techniques are described in the context of a customer interaction center and center agents, the techniques are applicable to other applications.

Figure 2B:
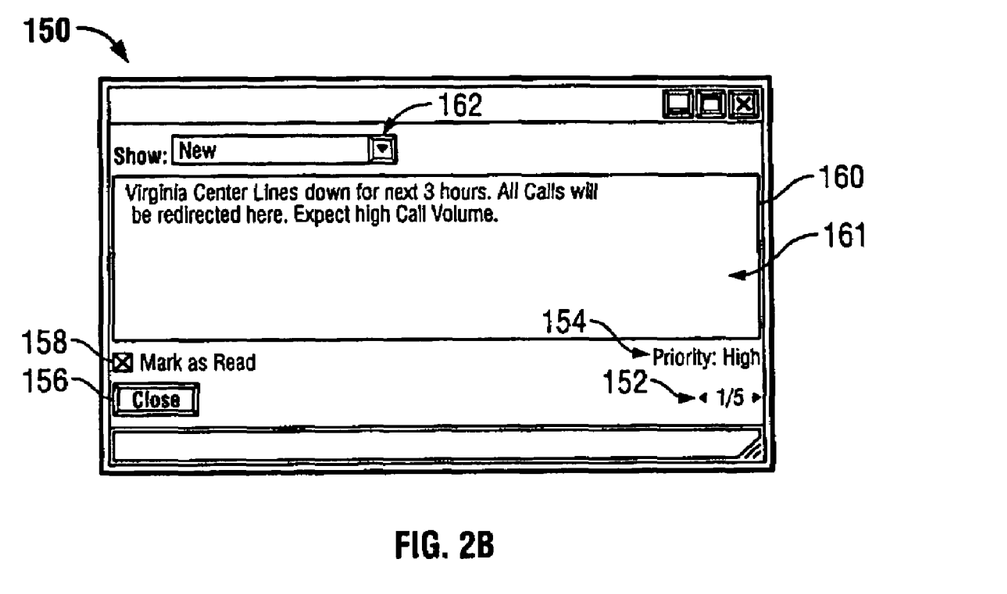

FIG. 2B shows an exemplary message window 150 for displaying messages in a GUI 100 of FIG. 2A. The window 150 includes a text area 160 for displaying a message 161 and a status control 162 for displaying a status of the message 161. In one embodiment, the status control 162 can be a drop-down menu allowing a user to set a filter to control the category or type of messages that are displayed in text area 160. For example, each message 161 may be associated with a status category such as "new", "read" and "past." The message window 150 also includes a priority identifier 154 indicating a priority assigned to a message (e.g., High Priority) and a navigational component 152 for scrolling forward/backward to other messages (e.g., ⅕ indicates that the displayed message is one of five "new" messages).

When a message is newly generated, it is assigned a status of "new" causing it to be displayed in the message area 108 (shown in FIG. 2A). An interaction center agent can select the drop-down menu 162 to show "new" messages. The agent can read the "new" messages and then mark a message with a "read" status. For example, the message window 150 includes a check box 158 to allow the interaction center agent to mark the message as "read." Changing the status of the message from "new" to "read" causes the message to be removed from the message area 108. Similarly, the agent can change the status of a message marked as read to unread (new) to make the message appear in the message area 108. The state of the message window 150 may be static, so to have the change in status take place, the interaction center agent closes the message window 150 by pressing close button 156. As a result, the marked message is removed from (or added to) the message area 108. As discussed in further detail below, a "past" status indicates an expiration time associated with a message has elapsed causing the message to be automatically removed from the message area 108. For example, a supervisor could have generated a message with an expiration period set to expire at a predefined date/time.

Figure 2C:
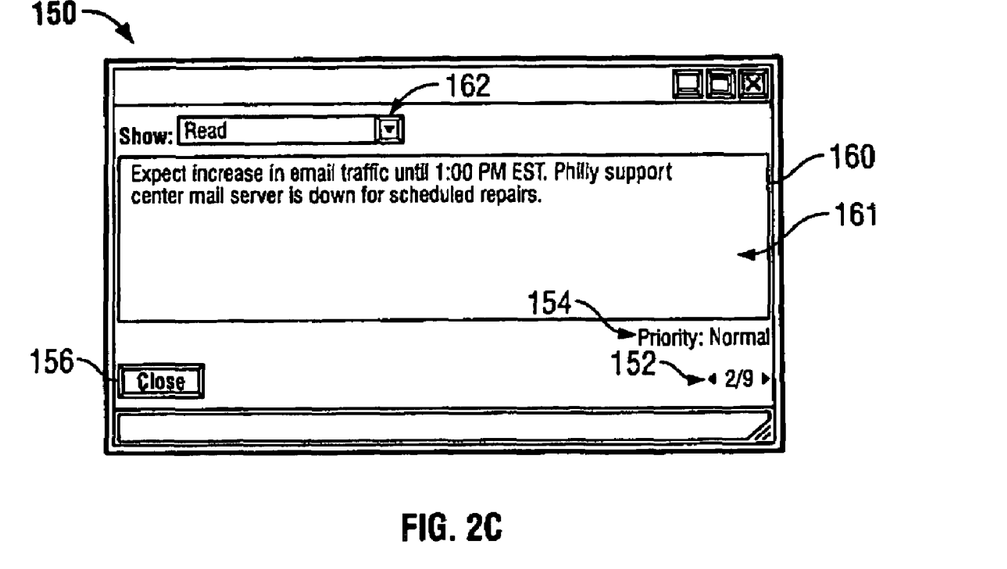

FIG. 2C shows message window 150 allowing a customer interaction center agent to view messages that have been previously "read" by the agent. The message window 150 shows drop-down menu 162 set to display "read" messages. For example, a customer interaction center agent may have read a message about a down interaction center earlier in the day. The agent can then search and view the previously "read" message by selecting "read" messages from drop-down menu 162 and then scroll through "read" messages using navigational control 152 until the desired message is displayed.

Figure 2D:
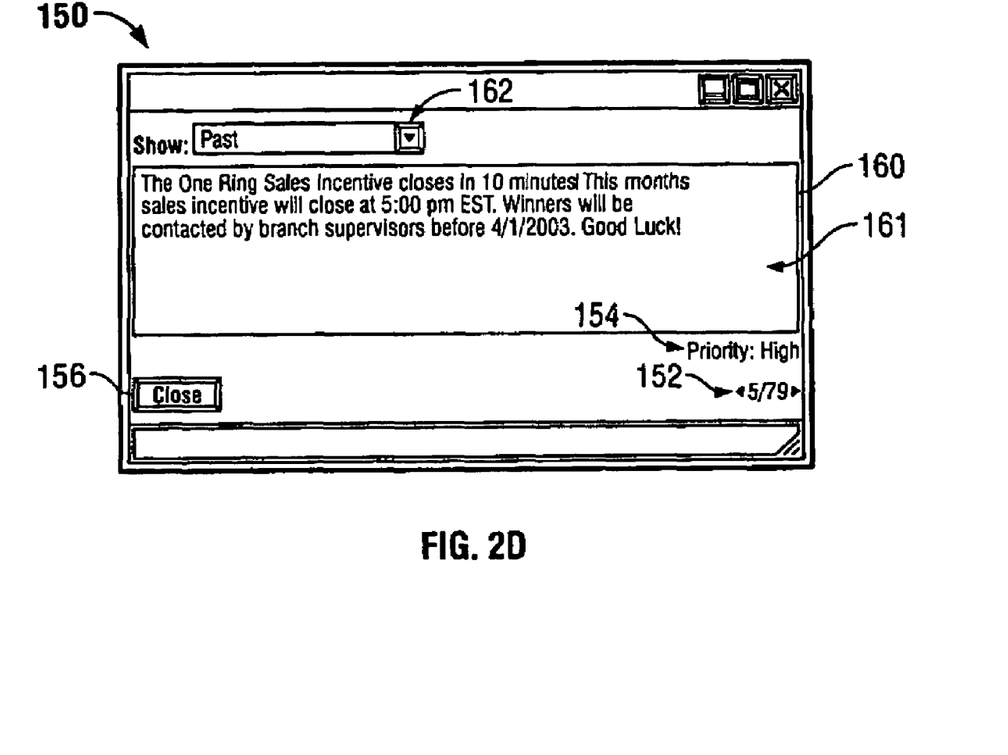

FIG. 2D shows message window 150 allowing a customer interaction center agent to view messages that have been marked with "past" status. Both "read" and "new" messages are automatically marked with "past" status once date/time expiration information elapses. In this case, the check box 158 of FIG. 2B is no longer available. For example, the interaction center agent views an old message about March sales incentive contest. The agent can then close the window 150 by pressing the close button 156 and continue with a customer interaction session and helping a customer.

Figure 2E:
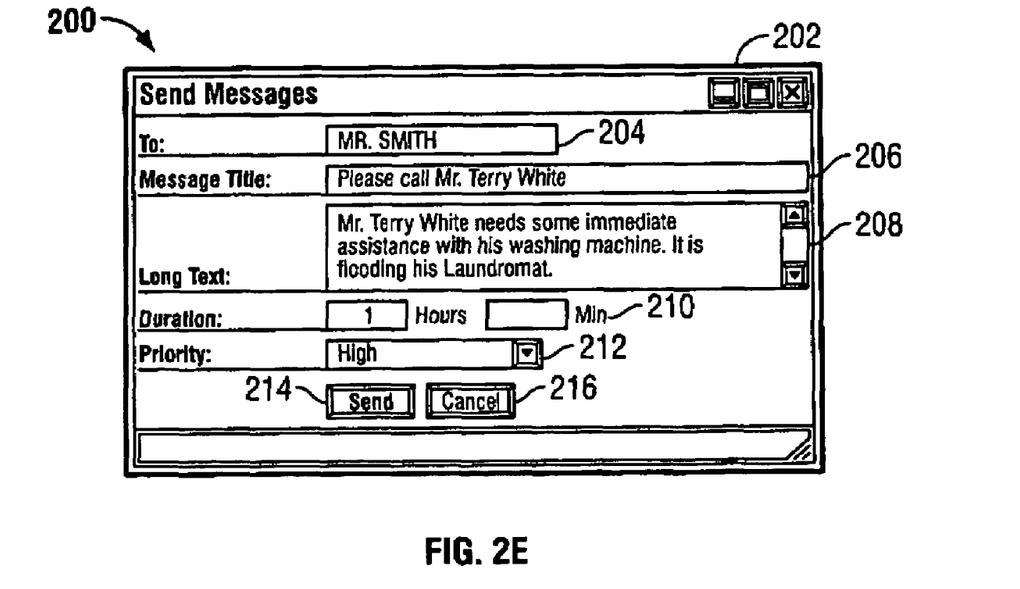

FIG. 2E shows a GUI 200 to allow a supervisor of a customer interaction center agent to send broadcast messages to a customer interaction center agent. The GUI 200 includes a window 202 with a text box 208 for a supervisor to enter a text message addressed to one or more customer interaction center agents. The supervisor can use recipient area 204 to identify the recipient of a message, title box 206 to provide a title of a message, and priority identifier 212 to assign a priority to a message. The supervisor can set when a message is to expire by entering in a duration area 210 expiration date/time for a message. The supervisor can then send the message to a recipient by pressing a send button 214 or cancel the message by pressing a cancel button 216. For example, a supervisor can generate a message and set the message to expire in one hour. The supervisor then sends the message to one or more customer interaction center agents where it is displayed in the scrolling message bar as a "new" message. When the message expires in an hour, the message is automatically marked as "past" and is removed from the scrolling message bar 108. The "past" message can still be viewed in the pop-up window 150 (FIG.2D) by setting the drop-down menu to "past" and searching for the particular "past" message.

Figure 3:
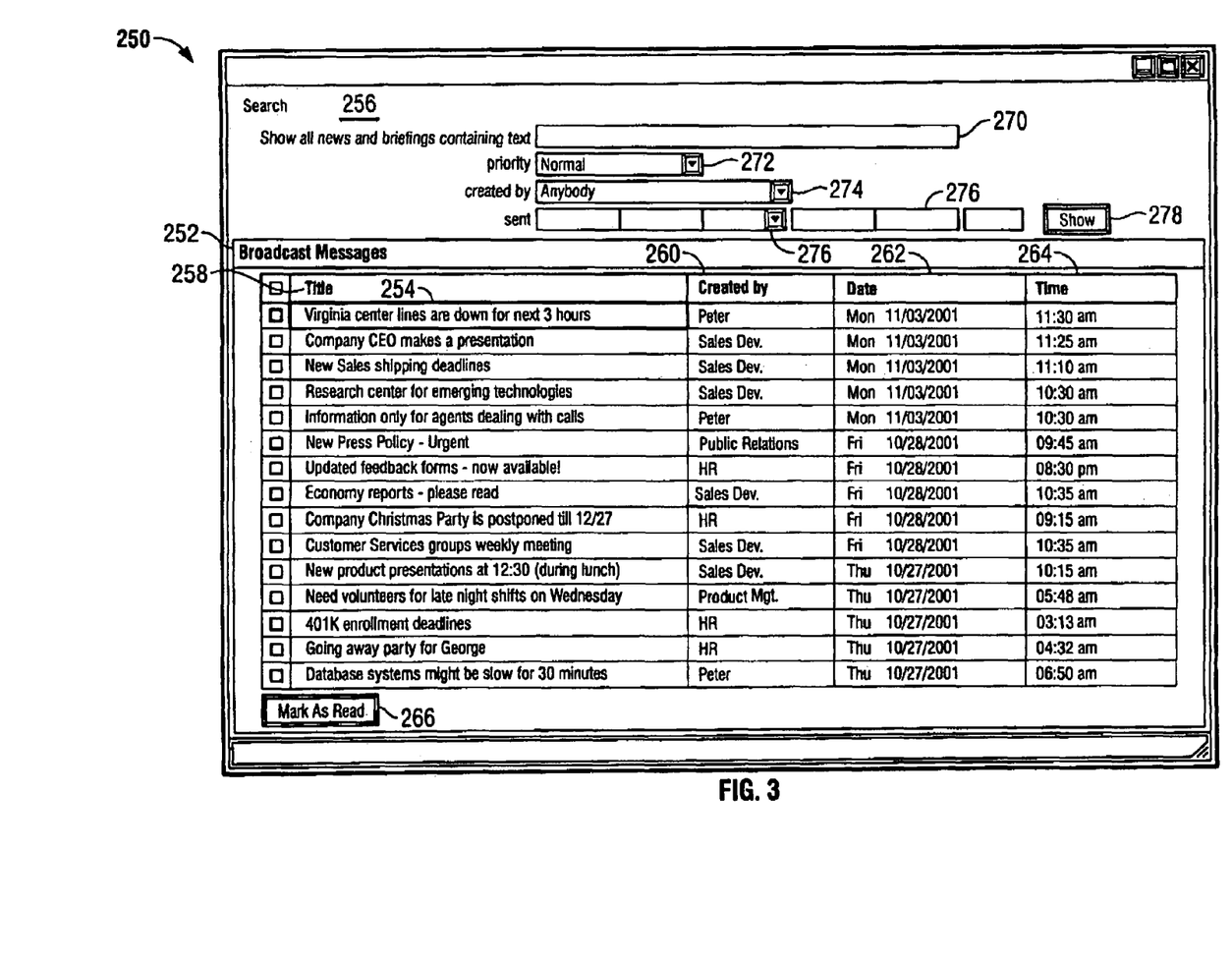
FIG. 3 shows an exemplary graphical user interface for broadcasting messages according to another embodiment.

FIG. 3 shows an exemplary GUI 250 for displaying broadcast messages to customer interaction center agents allowing agents to search/view messages while interacting with customers according to another embodiment. The GUI 250 provides a display area 252 for displaying messages 254 and a search area 256 for entering search criteria for searching messages 254. The display area 252 includes headings for displaying and sorting information about messages. For example, the display area 252 includes a title heading 258 to display the title of a message, a creation heading 260 to show the creator of a message, a date heading 262 to show the date a message was created and a time heading 264 to show the time a message was created. The display area 252 includes a read button 266 to allow a customer interaction center agent to mark one or more messages as read so that the marked message no longer appears in the scrolling message bar 108 (FIG. 2A).

The search area 256 includes fields for entering criteria for searching for messages according to the criteria. For example, the search area 256 includes a text search field 270 for entering text/phrases for searching for messages having such text/phrases, a priority field 272 for entering priority information for searching for messages matching the priority information, a creation field 274 for entering creation information for searching for messages matching such information, and a sent field 276 for entering date/time information for searching for messages matching this information. Once the criteria is entered, a show button 278 is pressed causing the system to search for messages matching the entered search criteria. The system then displays in display area 252 messages that match the criteria. The system can generate another window (not shown) displaying more detailed message information by allowing a user to select a message such as by "clicking" on the message.

Figure 4:
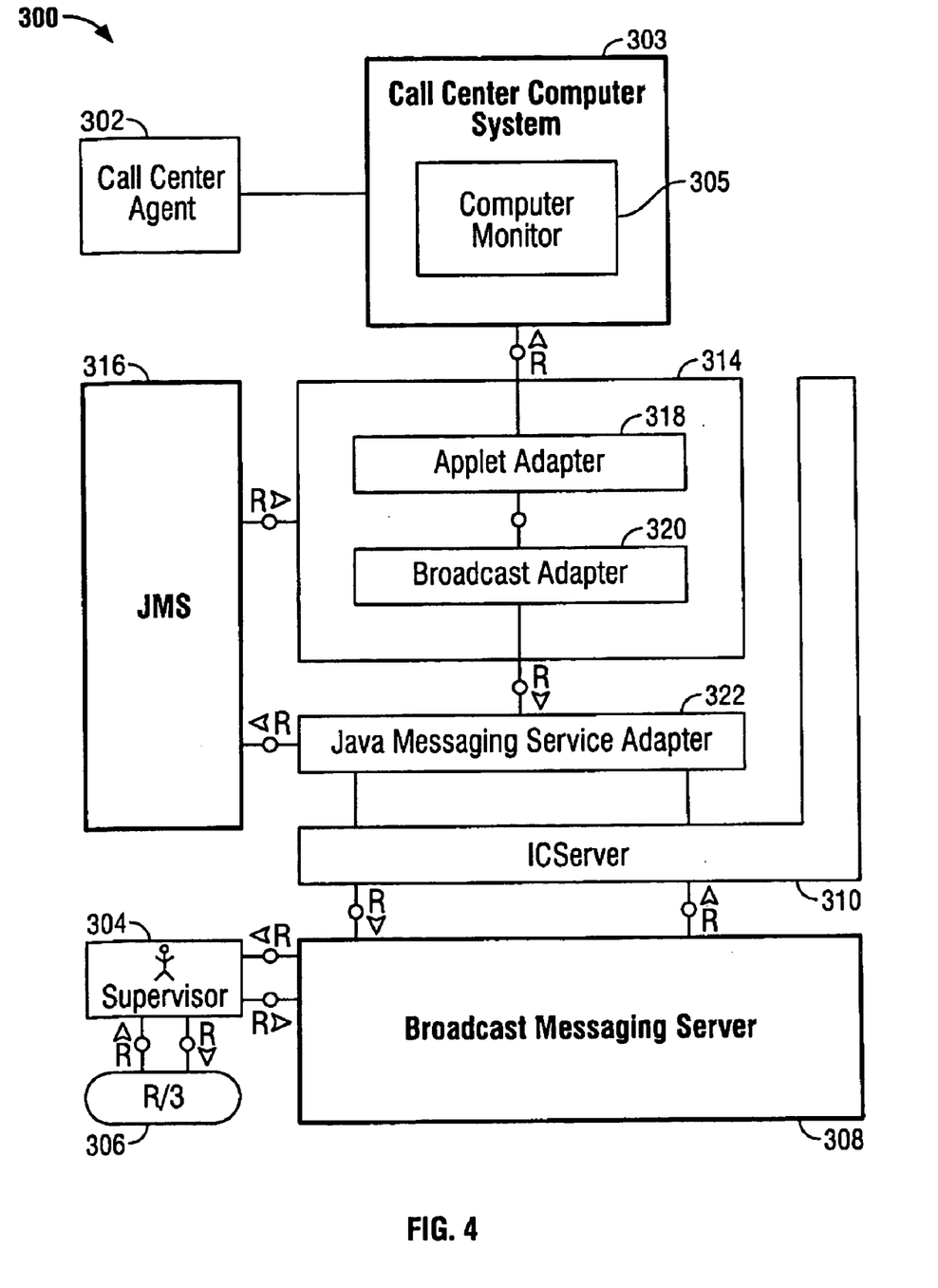
FIG. 4 shows an exemplary block diagram of a system for broadcasting messages according to an embodiment.

FIG. 4 shows an exemplary block diagram of a computing system 300 for broadcasting messages in GUI's shown in FIG. 2A through 2E and 3, according to one embodiment. The computing system 300 can be part of an interaction center having customer interaction center agents for communicating with customers using communications techniques such as telephone, Email, chat, instant messaging or other communications techniques. The computing system 300 includes a broadcasting messaging server (BMS) 308 that accepts connections from clients (i.e., customer interaction center agents) 302 and sends message to those clients from a supervisor 304 of the agent or automatically from the system. For example, the BMS 308 enables customer interaction center agent 302 to receive and view broadcast messages from supervisor 304. The customer interaction center agent 302 interacts with a computer 303 (e.g., personal computer with a network connection) with a computer screen 305 capable of providing a GUI for displaying messages from a supervisor 304. The supervisor 304 can also be connected to a business application 306 such as a customer relationship management (CRM) system from SAP, a software vendor.

The BMS 308 includes functionality to keep track of clients that are interested in receiving broadcast messages, route broadcast messages to all connected clients, act as a repository of all broadcast messages, and provide new clients (i.e., customer interaction center agents) with any broadcast messages that they may have received previously. The computing system 300 is capable of generating Web based GUIs for displaying messages using graphic techniques such as dynamic hypertext markup language (DHTML), hypertext markup language (HTML), extensible markup language (XML) or other techniques.

The computing system 300 includes an interaction center server (ICSERVER) 310 coupled between the BMS 308 and a BMS to Java messaging service (JMS) adapter 322. The BMS 308 is configured to track client sessions connected to ICSERVER 310, handle remote function call destination for advanced business application programming (ABAP) functions/programs from SAP that need to make calls to components inside the ICSERVER 310, and create and manage the lifetimes of session level and ICSERVER level service components. The adapter 322 interfaces to JMS 316 which includes functionality to maintain connections to BMS 308 on behalf of interaction center agents connected to the ICSERVER 310, convert messages from BMS 308 to an appropriate form for consumption by web clients, route messages sent by BMS 308 to the proper interaction center agents, provide data and filter functionality to the pop-up message window, and perform time-to-live operations on the messages and inform interaction center agents when messages expire.

The JMS 316 is a component providing services from a Java version 2 enterprise edition (J2EE) compliant application server. This service defines a topic as a well-defined destination, a publisher as an entity interested in sending messages to a topic and a subscriber as an entity interested in receiving messages from a topic. The service also defines a transport mechanism to carry messages from publishers to subscribers.

In one embodiment, the computing system 300 includes an Interaction center (IC) server session component 314 coupled between adapter 322 and customer interaction center agent 302. The component 314 contains a broadcast adapter 320 and an applet adapter 318. The broadcast adapter 320 includes functionality to setup proper filtering mechanism with JMS 316 such that only messages meant for this agent are received, communicate with the applet adaptor 318 to send the messages to the web client. Depending on the requirements/design of the applet adapter 318, the responsibility of broadcast adapter 320 may be merged with the applet adapter 318. The applet adapter 318 includes functionality to maintain connections with a message applet in the web client (e.g., a computer used by a customer interaction center agent 302), provide publish/subscribe mechanism between the web client and the ICSERVER 310 components, and send messages to the messaging applet present in the web client.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet. The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for use in a customer interaction center system, the method comprising:
    receiving by an interaction center agent device, for presentation in a single user interface panel work area, information pertaining to a particular customer with whom a human interaction center agent viewing the user interface panel is interacting in an interaction session;
    receiving, by the interaction center agent device, for presentation in a common message area on the user interface panel, an electronic broadcast message from a supervisor work station, the electronic broadcast message being received both by the interaction center agent device and by one or more other interaction center agent devices;
    displaying the electronic broadcast message in the common message area by automatically scrolling the electronic broadcast message across the common message area, wherein automatically scrolling the electronic broadcast message comprises displaying a text or graphical element of the electronic broadcast message as moving across the common message area; and
    receiving input from a pointing device associated with the interaction center agent device, the input specifying a cursor location over the common message area, wherein the automatic scrolling action of the electronic broadcast message is paused upon receiving the input.

2. The computer-implemented method of claim 1, wherein the electronic broadcast message includes a visual identifier to indicate a priority associated with the electronic broadcast message.

3. The computer-implemented method of claim 1, wherein the electronic broadcast message is displayed according to a criterion including at least one of date/time information related to when the electronic broadcast message is to expire or a priority associated with the electronic broadcast message.

4. The computer-implemented method of claim 1, wherein the electronic broadcast message includes status information indicating that the electronic broadcast message is new and not read by the human interaction center agent, when the electronic broadcast message is first added to the common message area.

5. The computer-implemented method of claim 1, wherein the electronic broadcast message includes status information indicating that the electronic broadcast message has been read by the interaction center agent and marked as read, whereby the read electronic broadcast message is subsequently removed from the common message area.

6. The computer-implemented method of claim 1, wherein the electronic broadcast message includes status information indicating that a time period of the electronic broadcast message has expired, whereby the expired electronic broadcast message is subsequently removed from the common message area.

7. The computer-implemented method of claim 1, further comprising receiving a user selection of the electronic broadcast message from the common message area, wherein the selected electronic broadcast message includes status information that is controllable by the interaction center agent.

8. The computer-implemented method of claim 7, wherein the user selection includes clicking on the electronic broadcast message in the message area with a computer input device including a mouse or keyboard.

9. The computer-implemented method of claim 7, wherein the user selection includes activating a message window to allow the interaction center agent to search/sort a list of electronic messages according to criteria including at least one of date/time a message was created, priority of a message, creator of a message, and one or more terms/phrases in a message.

10. The computer-implemented method of claim 1, wherein the common message area is separate from the work area in the single user interface panel, such that the information in the work area and the electronic broadcast message in the common message area are simultaneously viewable by the human interaction center agent during the interaction session.

11. A customer interaction center system comprising one or more computers configured to:
receive, at an interaction center agent device, for presentation in a single user interface panel work area, information pertaining to a particular customer with whom a human interaction center agent viewing the user interface panel is interacting in an interaction session;
receive, at the interaction center agent device, for presentation in a common message area on the user interface panel, an electronic broadcast message from a supervisor work station, the electronic broadcast message being received both by the interaction center agent device and by one or more other interaction center agent devices;
display the electronic broadcast message in the common message area by automatically scrolling the electronic broadcast message across the common message area, wherein automatically scrolling the electronic broadcast message comprises displaying a text or graphical element of the electronic broadcast message as moving across the common message area; and
receive input from a pointing device associated with the interaction center agent device and pause the automatic scrolling action of the electronic broadcast message when the input specifies a cursor location over the common message area.

12. The system of claim of 11, wherein the electronic broadcast message includes a visual identifier to indicate a priority associated with the electronic broadcast message.

13. The system of claim of 11, wherein the electronic broadcast message is displayed according to a criterion including at least one of date/time information related to when the electronic broadcast message is to expire or a priority associated with the electronic broadcast message.

14. The system of claim of 11, wherein the electronic broadcast message includes status information indicating that the electronic broadcast message is new and not read by the human interaction center agent, when the electronic broadcast message is first added to the common message area.

15. The system of claim of 11, wherein the electronic broadcast message includes status information indicating that the electronic broadcast message has been read by the interaction center agent and marked as read, whereby the read electronic broadcast message is subsequently removed from the common message area.

16. The system of claim of 11, wherein the electronic broadcast message includes status information indicating that a time period of the electronic broadcast message has expired, whereby the expired electronic broadcast message is subsequently removed from the common message area.

17. The system of claim of 11, further configured to receive a user selection of the electronic broadcast message from the common message area, wherein the selected electronic broadcast message includes status information that is controllable by the interaction center agent.

18. The system of claim of 17, wherein the user selection includes clicking on the electronic broadcast message in the message area with a computer input device including a mouse or keyboard.

19. The system of claim of 17, wherein the user selection includes activating a message window to allow the interaction center agent to search/sort a list of electronic messages according to criteria including at least one of date/time a message was created, priority of a message, creator of a message, and one or more terms/phrases in a message.

20. The customer interaction center system of claim 11, wherein the common message area is separate from the work area in the single user interface panel, such that the information in the work area and the electronic broadcast message in the common message area are simultaneously viewable by the human interaction center agent during the interaction session.

21. An article comprising a machine-readable medium storing instructions operable to cause one or more machines to perform operations comprising:
receiving by an interaction center agent device, for presentation in a single user interface panel a work area, information pertaining to a particular customer with whom a human interaction center agent is interacting in an interaction session;
receiving, by the interaction center agent device, for presentation in a common message area in the user interface panel, an electronic broadcast message from a supervisor work station, the electronic broadcast message being received both by the interaction center device and by one or more other interaction center agent devices;
displaying the electronic broadcast message in the common message area by automatically scrolling the electronic broadcast message across the common message area, wherein automatically scrolling the electronic broadcast message comprises displaying a text or graphical element of the electronic broadcast message as moving across the common message area; and
receiving input from a pointing device corresponding to the interaction center agent device, the input being associated with the common message area, and pausing the automatic scrolling upon receiving the input.

22. The article of claim 21, wherein the electronic broadcast message includes a visual identifier to indicate a priority associated with the electronic broadcast message.

23. The article of claim 21, wherein the electronic broadcast message is displayed according to a criterion including at least one of date/time information related to when the electronic broadcast message is to expire or a priority associated with the electronic broadcast message.

24. The article of claim 21, wherein the electronic broadcast message includes status information indicating that the electronic broadcast message is new and not read by the human interaction center agent, when the electronic broadcast message is first added to the common message area.

25. The article of claim 21, wherein the electronic broadcast message includes status information indicating that the electronic broadcast message has been read by the interaction center agent and marked as read, whereby the read electronic broadcast message is subsequently removed from the common message area.

26. The article of claim 21, wherein the electronic broadcast message includes status information indicating that a time period of the electronic broadcast message has expired, whereby the expired electronic broadcast message is subsequently removed from the common message area.

27. The article of claim 21, wherein the operations further comprise receiving a user selection of the electronic broadcast message from the common message area, wherein the selected electronic broadcast message includes status information that is controllable by the interaction center agent.

28. The article of claim 27, wherein the user selection includes clicking on the electronic broadcast message in the message area with a computer input device including a mouse or keyboard.

29. The article of claim 27, wherein the user selection includes activating a message window to allow the interaction center agent to search/sort a list of electronic messages according to criteria including at least one of date/time a message was created, priority of a message, creator of a message, and one or more terms/phrases in a message.

30. The article of claim 21, wherein the common message area is separate from the work area in the single user interface panel, such that the information in the work area and the electronic broadcast message in the common message area are simultaneously viewable by the human interaction center agent during the interaction session.

* * * * *